United States Patent
Butler et al.

(10) Patent No.: US 9,636,871 B2
(45) Date of Patent: May 2, 2017

(54) OPTIMIZING 3D PRINTING USING SEGMENTATION OR AGGREGATION

(71) Applicant: Microsoft Technology Licensing, LLC, Redmond, WA (US)

(72) Inventors: David Alexander Butler, Cambridge (GB); Nicolas Villar, Cambridge (GB); James W. Scott, Cambridge (GB); Stephen E. Hodges, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/972,731

(22) Filed: Aug. 21, 2013

(65) Prior Publication Data

US 2015/0057784 A1    Feb. 26, 2015

(51) Int. Cl.
    *B29C 67/00*    (2006.01)
    *G06F 3/12*    (2006.01)

(52) U.S. Cl.
    CPC ........ *B29C 67/0088* (2013.01); *G06F 3/1211* (2013.01); *G06F 3/1241* (2013.01); *G06F 3/1262* (2013.01); *G06F 3/1288* (2013.01)

(58) Field of Classification Search
    CPC .................................................. B29C 67/0088
    USPC ............................................. 358/1.13–1, 15
    See application file for complete search history.

(56) References Cited

U.S. PATENT DOCUMENTS

| | | | |
|---|---|---|---|
| 7,261,542 B2 | 8/2007 | Hickerson et al. | |
| 7,499,845 B1* | 3/2009 | Quincy et al. | 703/7 |
| 7,766,641 B2 | 8/2010 | Silverbrook | |
| 2007/0081828 A1* | 4/2007 | Radulski et al. | 399/27 |
| 2008/0147221 A1* | 6/2008 | Sukesh | G06F 9/5038 700/100 |
| 2009/0015585 A1* | 1/2009 | Klusza | 345/420 |
| 2010/0140849 A1* | 6/2010 | Comb et al. | 264/401 |
| 2011/0087350 A1 | 4/2011 | Fogel et al. | |
| 2011/0252163 A1 | 10/2011 | Villar et al. | |
| 2012/0084968 A1 | 4/2012 | Nath et al. | |

(Continued)

OTHER PUBLICATIONS

Sarik, et al., "Combining 3D Printing and Printable Electronics", In International Conference on Tangible, Embedded and Embodied Interaction, Feb. 19, 2012, 5 pages.

(Continued)

*Primary Examiner* — Qian Yang
(74) *Attorney, Agent, or Firm* — Lee & Hayes, PLLC

(57) ABSTRACT

3D printing may be optimized by segmenting input jobs and/or combining parts of input jobs together. In an embodiment, a user-defined metric is received associated with each input job and this is used in scheduling input jobs to optimize latency and/or throughput of the 3D printing process, along with the printing envelope and other characteristics of the 3D printers used. In various embodiments, the scheduling may comprise dividing a 3D object into a number of parts and then scheduling these parts separately and/or combining 3D objects, or parts of 3D objects, from various input jobs to be printed at the same time on the same 3D printer. In various embodiments, the scheduling is repeated when a new input job is received and changes made during printing. In various embodiments, a user may submit an updated version of an input job which is already in the process of being printed.

20 Claims, 9 Drawing Sheets

(56) References Cited

U.S. PATENT DOCUMENTS

| | | | |
|---|---|---|---|
| 2012/0188588 A1* | 7/2012 | Dennison | G06F 3/1205 358/1.15 |
| 2012/0212776 A1 | 8/2012 | Murata | |
| 2012/0224755 A1* | 9/2012 | Wu | 382/131 |
| 2013/0053995 A1* | 2/2013 | Hashimoto et al. | 700/97 |
| 2013/0329243 A1* | 12/2013 | Pettis et al. | 358/1.13 |
| 2014/0091036 A1* | 4/2014 | Knight et al. | 210/635 |

OTHER PUBLICATIONS

Ahlberg, Liz, "Particle-Free Silver Ink Prints Small, High-Performance Electronics", Published on: Jan. 12, 2012, Available at: http://news.illinois.edu/news/12/0112ink_JenniferLewis.html.
Brandon, JF, "Stratasys and Optomec Join Forces to Make 3d Printed Electronics", Published on: Apr. 17, 2012, Available at: http://solidsmack.com/fabrication/stratasys-and-optomec-join-forces-to-make-3d-printed-electronics/.
"Spray-on Battery, 3D Printing", Published on: Jun. 29, 2012, Available at: http://markproffitt.com/2012/06/29/spray-on-battery-3d-printing/.
Watson, Shayna, "3D Printing is Merged with Printed Electronics", Published on: Mar. 23, 2012, Available at: http://www.optomec.com/site/latest_news/news95.
Leigh, et al., "A Simple, Low-Cost Conductive Composite Material for 3D Printing of Electronic Sensors", Published on: Nov. 21, 2012, Available at: http://www.plosone.org/article/info%3Adoi%2F10.1371%2Fjournal.pone.0049365.
"3D Printing", Published on: Mar. 5, 2013, Available at: http://www.explainingthefuture.com/3dprinting.html.
Malone, et al., "Freeform Fabrication of Zinc-Air Batteries and Electromechanical Assemblies", In Rapid Prototyping Journal, vol. 10, Issue 1, Jan. 30, 2004, 12 pages.
"RepRapFileFormat", Published on: May 14, 2012, Available at: http://reprap.org/wiki/RepRapFileFormat.
Sells, et al., "Rapid Prototyping Electronic Circuits: Supplementary Manual based on Project EN310X", Published on: Jul. 15, 2004, Available at: http://fennetic.net/pub/RPEC-manual.pdf.
Bayless, et al., "Wire Embedding 3D Printer", Published on: Apr. 12, 2010, Available at: http://www.reprap.org/nriediawiki/images/2/25/SpoolHead_FinalReport.pdf.
Abdellah A., et al, "Spray Deposition of Organic Semiconducting Thin-Films: Towards the Fabrication of Arbitrary Shaped Organic Electronic Devices.", in Organic Electronics, 11 (2010), 7 pages.
Willis K., et al, "Printed Optics: 3D Printing of Embedded Optical Elements for Interactive Devices", in UIST 12, Oct. 7-10, 2012, 10 pages.
Kataria A., et al, "Building Around Inserts: Methods for Fabricating Complex Devices in Stereolithography", 2000 ASME Design Engineering Technical Conferences and Computers and Information in Engineering Conference, Sep. 10-13, 2000.
"3D printing with Windows", Published on: Jun. 26, 2013 Available at: http://blogs.technet.com/b/microsoft_blog/archive/2013/06/26/3d-printing-with-windows.aspx.
"International Search Report & Written Opinion for PCT Patent Application No. PCT/US2014/051566", Mailed Date: Oct. 17, 2014, 8 Pages.
Written Opinion of the International Preliminary Examining Authority issued in PCT/US2014/051566, mailed Jul. 8, 2015, 6 pps.
"International Preliminary Report on Patentability Issued in PCT Application No. PCT/US2014/051566", Mailed Date: Nov. 30, 2015, 7 Pages.
"Build Envelope on 3D Printers," Retrieved Oct. 19, 2016, Available at: https://www.whiteclouds.com/3dpedia-index/build-envelope-3d-printers, 3 pages.

* cited by examiner

OPTIMIZING 3D PRINTING USING SEGMENTATION OR AGGREGATION

BACKGROUND

Three-dimensional (3D) printing provides a way of quickly producing prototype devices and there are many different 3D printing technologies which may be used, including stereo-lithography, selective laser sintering and fused filament fabrication (FFF), which is also referred to as fused deposition modeling (FDM). Although fabrication of a prototype using 3D printing is rapid compared to conventional techniques such as injection molding, it can still take many hours, depending on the size of the object and the maximum size of prototypes that can be formed is limited by the printing envelope (or tray size) of the 3D printer.

The embodiments described below are not limited to implementations which solve any or all of the disadvantages of known 3D printing systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

3D printing may be optimized by segmenting input jobs and/or combining parts of input jobs together. In an embodiment, a user-defined metric is received associated with each input job and this is used in scheduling input jobs to optimize latency and/or throughput of the 3D printing process, along with the printing envelope and other characteristics of the 3D printers used. In various embodiments, the scheduling may comprise dividing a 3D object into a number of parts and then scheduling these parts separately and/or combining 3D objects, or parts of 3D objects, from various input jobs to be printed at the same time on the same 3D printer. In various embodiments, the scheduling is repeated when a new input job is received and changes made during printing. In various embodiments, a user may submit an updated version of an input job which is already in the process of being printed.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, although 3D printing provides a rapid method of generating 3D structures compared to conventional techniques, it can still take many hours to create a structure, dependent upon the size of the structure. This limits the flexibility for a user who may find, after submitting a job to the 3D printer, that they need to create a small part urgently, and although that small part may only take 10 minutes to print, they need to wait until the original job has been completed (e.g. wait several hours) before the urgent job can be started. Similarly, if the user realizes that there is a mistake in the job that has been submitted, with existing 3D printing systems they must cancel the job and start the printing process again or wait until the job is finished before they can re-submit the corrected job. This wastes both time and resources (e.g. materials already used in printing the original, incorrect job).

Figure 1:
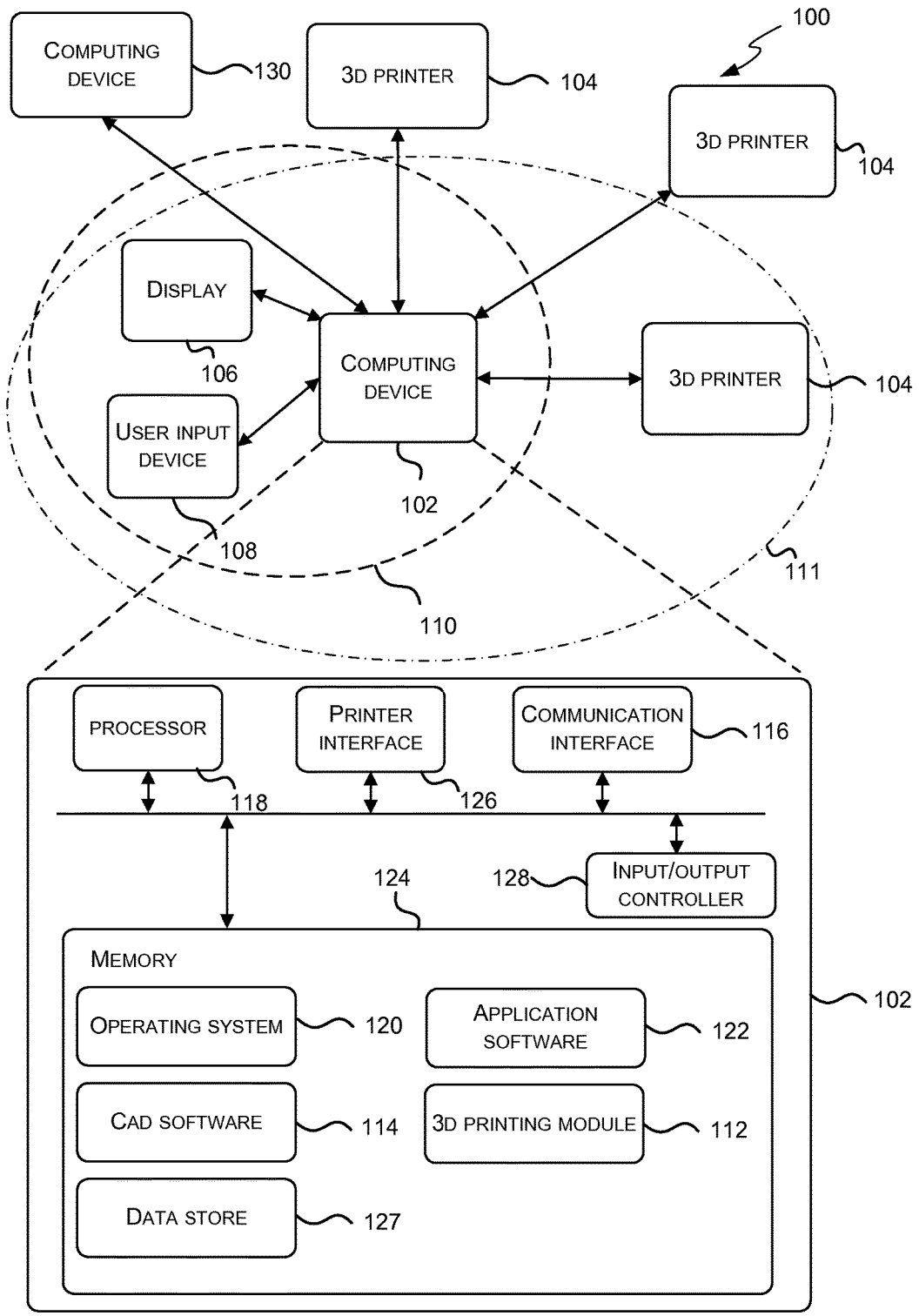
FIG. 1 is a schematic diagram of an example 3D printing system.
Figure 2:
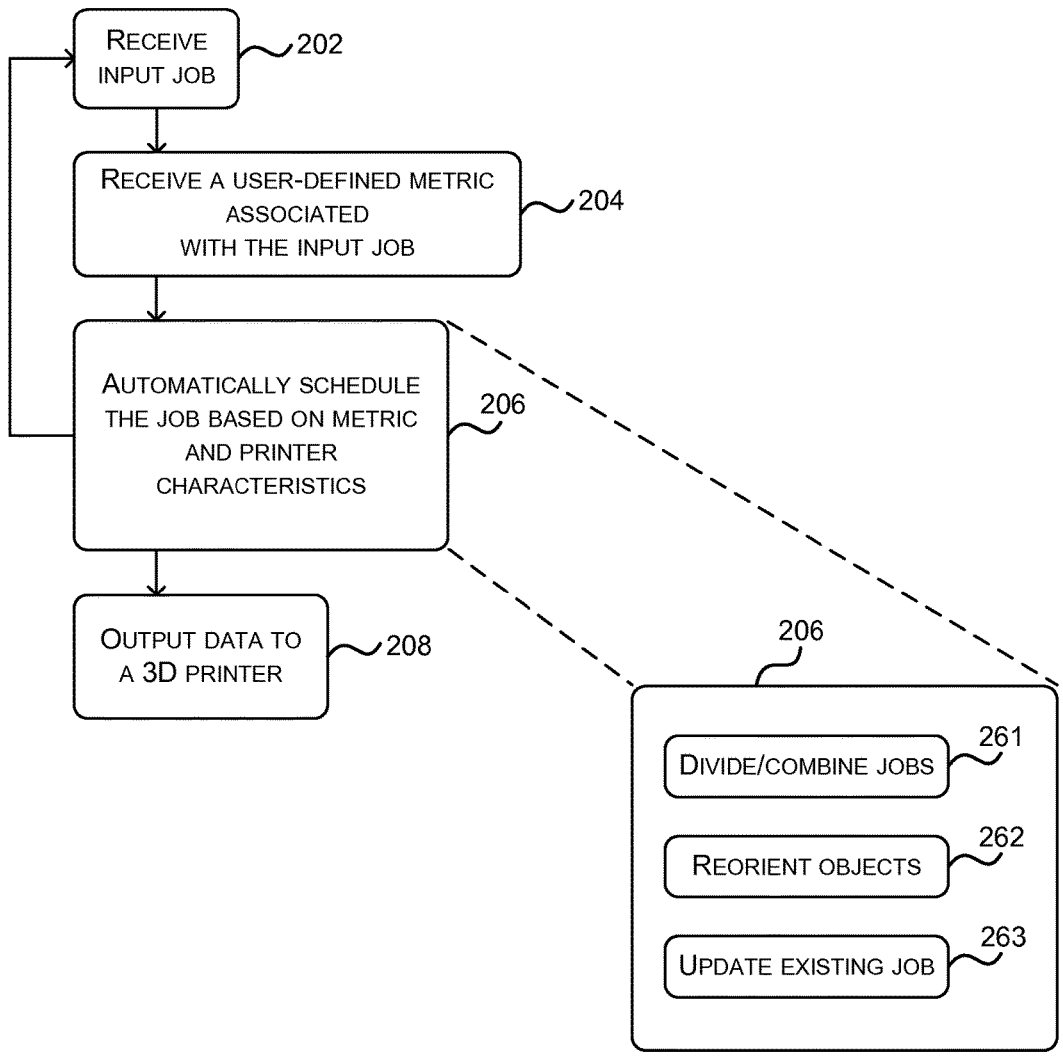
FIG. 2 is a flow diagram of an improved method of controlling a 3D printer or plurality of 3D printers.

FIG. 1 is a schematic diagram of an example 3D printing system 100 and FIG. 2 is a flow diagram of an improved method of controlling a 3D printer (or plurality of 3D printers) which provides additional flexibility to the users (i.e. those people submitting print jobs for 3D printing). As described in more detail below, the method optimizes latency and/or throughput based on the printing envelope and other characteristics of the one or more printers and additionally based on a user-defined metric. There are many different ways in which the latency and/or throughput can be optimized automatically by the method and examples include, but are not limited to:

- Dividing a job into multiple parts that can be printed in parallel on a single 3D printer or on more than one 3D printer;
- Using pre-printed or pre-formed blocks in combination with printed parts to complete a job;
- Combining multiple jobs within a single printing envelope (i.e. within the print tray of a single 3D printer);
- Reorienting the object;
- Enabling jobs to be added on the fly (i.e. whilst an existing, separate, job is being printed), such that different objects may start at different vertical heights above the tray;
- Enabling jobs to be amended or cancelled during printing;

Enabling jobs to be removed during printing; and
Enabling printing to start before the entire 3D design of the object has been completed.

The method may comprise one of these features or any combination of two or more of these features and/or may comprise additional features not listed above. For example, a first job may be segmented and then a part of that first job may be combined with a second job within a single printing envelope of a 3D printer (e.g. with the other parts of the first job being either printed on another 3D printer or on the same 3D printer but subsequent to the printing of the aggregation of the part of the first job and the entire second job). Where more than one job or part of a job is printed at the same time within the same printing envelope of the same printer, the two objects which are formed may be connected by a support material (or raft), so that they can be separated following printing. The support material may, for example, be soluble in water, potassium hydroxide or other liquid or may be removable in any other way (e.g. by baking or irradiating the parts to cause the support material to break down). As described in more detail below, in some examples it may be possible to separate and remove a part before printing has been completed.

The other characteristics of the one or more printers which are used in the optimization may include any characteristics of a 3D printer (e.g. printing characteristics or other characteristics). These characteristics may, for example, comprise one or more of:

Printing technology used;
Resolution (which may be different for different axes);
Speed (which again may be different in different axes);
Cost (e.g. cost of the model material and/or the support material or cost of use of the printer where a fee is charged by a third party);
Current configuration and status of the printer (as described in more detail below);
Physical location of the printer (e.g. a nearby printer may be preferred); and
Materials (e.g. different printers may print different model materials or use different support materials, where these different materials may have different properties such as different mechanical properties, different colors, etc).

Where the current configuration and status of the printer is one of the characteristics used there may be one or more different aspects which are taken into consideration, and examples include:

whether a printer requires maintenance before next being usable;
the particular model/support material cartridges loaded and the time taken, labour required, and monetary cost (due to some waste incurred when changing cartridges which can be quite high) to change the cartridges may also be factored in;
the remaining material levels in the cartridges, e.g. a small print may complete but a larger print may not have enough model or support material.
how full the printer's waste bin is, so again a large print may run out of room in the waste bin (or any other capacity/time-limited element of the printer).
the age of the printer or the printer parts, which may mean that while it can still print, its output is less good/reliable than another otherwise identical printer, so it can be used for more "draft" versions while another printer is used for "final" versions, or both printers can be used for a split model but the higher-resolution parts sent to the better printer.

When performing the optimizing/scheduling operation, future jobs may be taken into account (e.g. if you have material A installed in a printer, and two prints using A (less urgent) and B (more urgent), B may nonetheless be delayed since the overhead of changing material is high). In another example, a short print may be scheduled first to complete inside office hours so that the technician can retrieve it and enable a large print to run overnight. Or the technician/users' calendars can be looked at so that if they e.g. have a meeting at 3 pm-4 pm, the printer tries to not have anything finish in that period.

As described above, latency and/or throughput may be optimized by the methods described herein. In a first example scenario where two objects are to be printed, one object may be printed on top of each other which makes the combined print faster (a throughput increase) at the cost of neither being available until both have been printed sequentially (an increase in latency), although if it is possible to remove the first part before the second part has been completed, there may be no impact on the latency. In a second example scenario where an object is added to another print (which has already started printing), the throughput is increased since the combination of both objects is completed more quickly than if the printer was stopped (and possibly emptied and cleaned) between objects; however the latency of the first object may be increased (if it is not available until the second object has completed) whilst the latency of the second object is decreased.

Cancelled jobs may enable a fresh base/raft to be established on which a new object may be printed without requiring removal of trays and/or cleaning to be done.

The 3D printing system 100 shown in FIG. 1 comprises a computing device 102 connected to one or more 3D printers 104. The computing device 102 may be co-located with the 3D printers 104, such that there may be a direct connection (wired or wireless) between the computing device 102 and a 3D printer 104, or alternatively the computing device 102 may be connected to a 3D printer via a network. Where the computing device 102 is not co-located with a 3D printer 104, they may be connected via a network such as the internet or a network within a home or business. It will be appreciated that in some example systems, there may be some 3D printers which are co-located with the computing device 102 and other 3D printers which are remote from the computing device 102.

In this example, the computing device 102 has a separate display 106 and user input device 108 (e.g. mouse and keyboard), but in other examples, the display 106 and/or user input device 108 may be integral to the computing device 102 (e.g. where the computing device 102 is a laptop computer or tablet computer), as indicated by the dotted outline 110. In yet further examples, the computing device 102 may act as a printer server (and hence may not have a connected display 106 and user input device 108) and users may instead submit print jobs or otherwise interact with the printer server via separate computing devices 130 which connect to the printer server (computing device 102) via a network and may be considered part of the system 100 or external to the system 100. In an example, the printing system 100 may provide 3D printing services for remote users who access the service via the printer server and the printed parts may then be delivered to the user (e.g. by courier or postal service). Furthermore, although the computing device 102 is shown separately from the 3D printer 104, in some examples, the computing device 102 may be integrated within the 3D printer 104 to form a single unit (as indicated by the dotted outline 111), e.g. the 3D printer 104 may incorporate a computing device 102 acting as a printer server. In other examples, a computing device 102 acting as a printer server may be located remotely from both the user computing devices 130 and the 3D printers 104 (e.g. it may be a cloud-based server). In an example, the printer may provide a user with enhanced 3D printing capabilities (in particular enhanced scheduling capabilities) using their own 3D printer (e.g. computer device 130 and 3D printer 104 may be co-located and computer device 102, acting as a printer server, may be remote).

The improved method of controlling one or more 3D printers which is shown in FIG. 2 may be implemented in the system 100 shown in FIG. 1 and in particular, this method may be implemented by the computing device 102 (e.g. by the 3D printing module 112). As shown in FIG. 2, an input job is received (block 202). This input job comprises data describing a 3D object which is to be printed using a 3D printer (e.g. in the form of a 3D model). The input job may, for example, comprise a file output by CAD software (e.g. a .STL file, AMF (Additive Manufacturing Format as defined by ASTM (American Society of Testing & Materials)) file amongst others). The 3D model may have been generated locally by a user (e.g. on the computing device 102 using CAD software 114) or may be received (in block 202) from an external source (e.g. via communication interface 116 from computing device 130).

In addition to receiving an input job (in block 202), a user-defined metric associated with the input job is also received (block 204). This user-defined metric may take any form and may, for example, comprise one or more of the following:

A priority rating associated with the production of the 3D object (e.g. so that a user can indicate the relative priority of jobs submitted);

A timescale in which the 3D object is required;

A parameter indicating whether the object can be segmented for 3D printing (e.g. so a user can prevent automatic segmentation in some situations);

A parameter indicating that the design of the 3D object is not finalized yet;

A parameter identifying which parts of the 3D object are final and which are not yet final (e.g. so the printer can orient the object so that the final parts are printed first, leaving the user as long as possible to edit the non-final parts);

A parameter identifying a part of the 3D object as being of particular interest to the user;

A parameter indicating a maximum printing cost for a 3D object (e.g. in terms of a monetary value or the amount of model and/or support material used);

A parameter indicating that the input job is an updated version of a previously submitted job (and in some examples whether the previously submitted job should be cancelled or continued); and One or more parameters indicating the desired resolution, color and material properties, or ranges or multiple options for each of these (in some examples a range of suitable materials may be specified to improve the likelihood that the object can be printed without much delay).

Although the metric is a user-defined metric, it will be appreciated that in some examples the metric will be defined by the same user that designed the 3D object and in some examples the metric will be defined by another user. Although there is a user-defined metric for each input job, in some examples the same user-defined metric may be associated with a plurality of input jobs. In some examples there may be multiple user-defined metrics associated with a single job and they may all be used in the optimization process.

Based on the inputs received (in blocks 202-204), the method then automatically schedules the input job (received in block 202). The scheduling is based on the printing envelope and other characteristics of one or more 3D printers which are available and also based on the user-defined metric (received in block 204) in order to optimize latency and/or throughput of the one or more 3D printers (block 206). This scheduling operation (or stage) may also be referred to as an optimization operation (or stage). In performing this optimization (in block 206), multiple jobs may be considered and these jobs may all be new input jobs (i.e. jobs where printing has not yet been started) or the multiple jobs may include one or more new input jobs and one or more existing jobs (e.g. jobs which are already in progress, i.e. already being printed by a 3D printer). As described above, the automatic scheduling (in block 206) may comprise one or more of: dividing and/or combining jobs (block 261), reorienting objects (block 262) and updating existing jobs (block 263) and all of these aspects are described in more detail below. As described in more detail below, in some examples, updating an existing job may comprise cancelling that existing job. In addition, or instead, the automatic scheduling may also comprise creating variants of part of the 3D object described in the input job and this is described in more detail below with reference to FIG. 9.

Having performed the automatic scheduling (in block 206), data is output to one or more 3D printers (block 208). The data which is output to the one or more 3D printers (in block 208) may comprise data for only a part of the scheduled jobs (as determined in block 206), e.g. for a few horizontal slices at a time where FFF/FDM is used, or data for the entire scheduled job(s). This data may be of the same format as the input job or may be formatted appropriately for the particular 3D printer to which the data is sent (e.g. in a manufacturer-specific format or using G-code/G programming language). As described above, the computing device 102 may interface directly to the 3D printer 104 or the data may be output (in block 208) to a 3D printer over a network (e.g. via communication interface 116).

The method may then be repeated (as indicated by the arrow from block 206 to block 202) such that the optimization (in block 206) is performed each time a new job is received (in block 202) or at some other interval, e.g. while the 3D printer is running, i.e. is in the process of printing. It will be appreciated that any optimization stage may not necessarily result in a change to the printing schedule; however, in some examples it may result in a change. If for example, there are three jobs which are scheduled, A, B and C in order of priority (as indicated by the user-defined metric) and job A is being printed, if a new job, D, is received which is higher priority (as indicated by the user-defined metric associated with the new job) than either of jobs B and C, the new job D will be inserted into the schedule above the lower priority jobs B and C, even though job D was received after those lower priority jobs. If, however, the new job D is both high priority and small, it may be possible to print both the current job (job A) and the new job (job D) at the same time within the same print envelope (i.e. on the same 3D printer), in which case, the automatic scheduler will determine this and output data to the 3D printer which first creates a starting surface (typically a flat raft, although curved or other non-flat surfaces may be used) on which to form the object of job D (e.g. made of the support material) in parallel to forming the next slices of job A and then forms job D alongside the remainder of job A.

Figure 3:
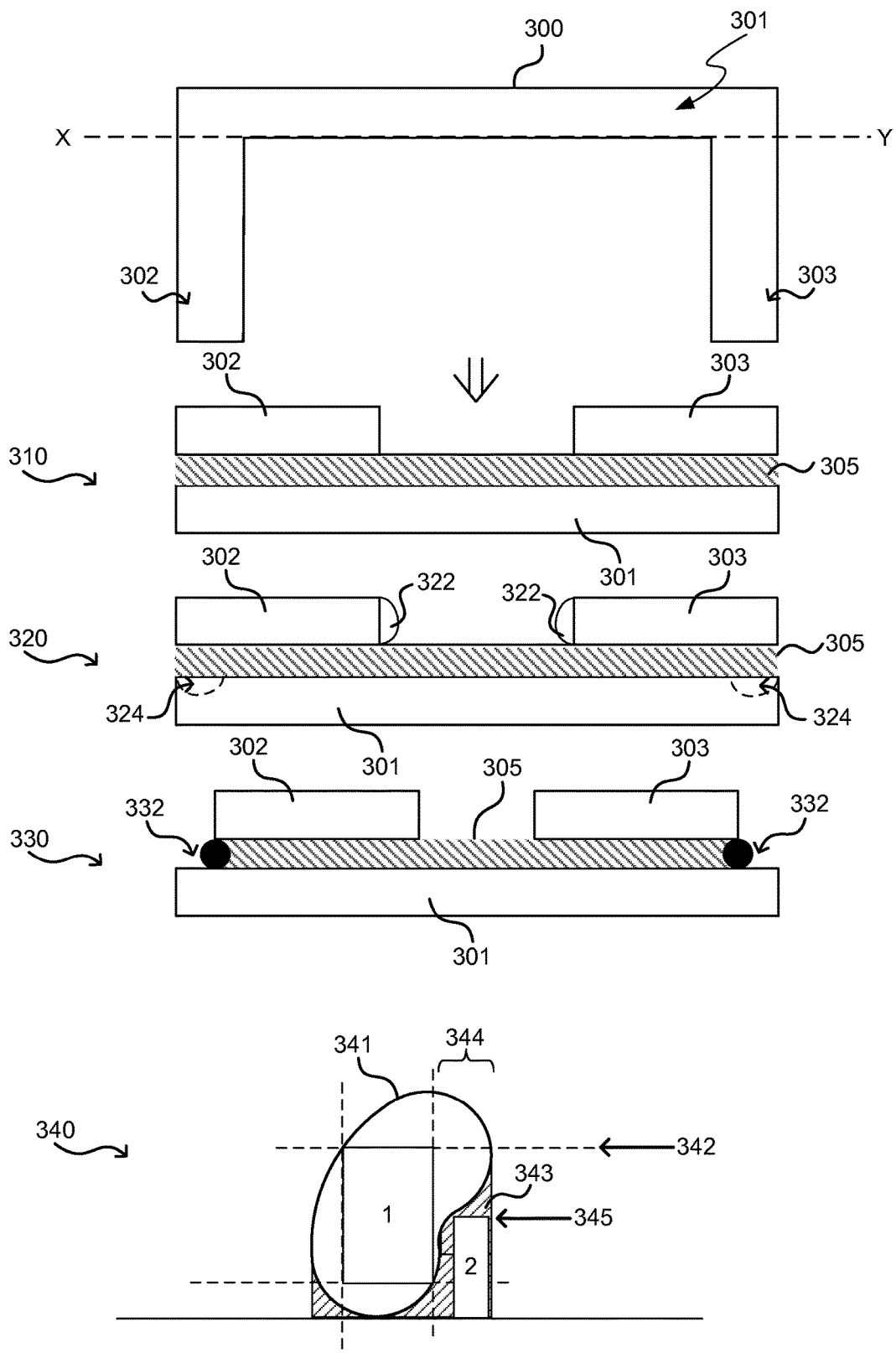
FIG. 3 shows a number of schematic diagrams of a 3D object segmented into sub-objects and rearranged for printing.

As described above, the scheduling to optimize latency and/or throughput (in block 206) may involve the division or segmentation of an input job into multiple sub jobs (in block 261), as shown in the schematic diagram of FIG. 3. The term 'sub job' is used herein to refer to a 3D printing job which will create a part of a 3D object which corresponds to an input job and this part may be referred to as a 'sub-object'. FIG. 3 shows an object 300 which is segmented along dotted line X-Y into three sub-objects 301-303 and each sub-object corresponds to a sub-job (which will form the particular sub-object). It will be appreciated that the object 300 and sub-objects 301-303 are all 3D objects and they are shown in cross section in FIG. 3.

The segmentation (in block 261 of FIG. 2) may, for example, be performed because the input job is too large to be printed in a single piece (e.g. it extends outside the printing envelope of a single 3D printer), because it is quicker to print sections of the object in parallel on different printers and/or because the shape of the object means that printing it as one piece is considerably slower than printing it in a plurality of sub-jobs. For example, in many 3D printing technologies the 3D objects are formed by building up layers of material and this means that there may be a fixed (or minimum) time associated with building up a layer and then a delay time (e.g. during which the stage on which the object is being formed moves) before the next layer can be formed. This means that there may be one axis, within the 3D space, along which 3D objects grow more slowly (e.g. the vertical direction). In some 3D printers, the resolution of the printing may not be the same in all axes and so a 3D object may be segmented (and/or reoriented) in order that features can be printed at the required resolution. For example, if the resolution in the z (vertical) direction is lower than the resolution in the x-y plane, an object may be segmented and/or reoriented if necessary so that the higher resolution features are formed in the x-y plane and not in the z direction.

Referring back to the example object 300 shown in FIG. 3, if the object is divided into the three sub-objects 301-303, it can be 3D printed in a smaller overall volume (e.g. in fewer layers) and so can be printed more quickly. As shown in example 310, the control software schedules the printing of the first, largest sub-object 301 followed by the two smaller sub-objects 302-303 in parallel (i.e. at the same time). The objects may be spaced with a layer of support material 305.

There are many different ways by which the segmentation may be performed. In an example an algorithm may be used which creates dividing planes between parts of the 3D object based on uniformly distributing the mass (so each sub-object occupies a similar volume of raw material regardless of shape for printing). Another example may use a segmentation strategy which optimizes the separation into smaller sub-objects to reduce the maximum dimensions of each sub-object such that they fit the printer build envelope. A further example may slice tall objects into thick sub-slices. Some object division strategies may analyze the structural form of large objects and select dividing points which enable easy rejoining/connecting/assembly or even additional connector mechanisms (as described below) to be added such as screw threads or inserts/pegs. Optimizing using Finite Elements Analysis may be used to ensure each sub-object is mechanically sound and not overly weakened by division. Many strategies may involve mechanical/structural optimization to avoid undesirable artifacts such as slivers of materials etc. It will be appreciated that different segmentation methods may be used for different types/shapes of objects and in some examples, combinations of methods may be used.

In some examples, the 3D printing material (i.e. the model material and/or the support material) may additionally be provided in pre-printed blocks and these blocks may, for example, be provided in different sizes. Where such pre-printed blocks are available, the segmentation of a 3D object (in block 261 of FIG. 2) may comprise segmenting the object into a core made up from one or more of these pre-printed blocks plus a customization part which is an outer shell which is printed on the 3D printer. This can be described with reference to the final example 340 shown in FIG. 3 (again a cross-section through the 3D object is shown). The segmentation process may use any of the algorithms or strategies described above and in some examples, the segmentation considers the robustness of the finished object such that, for example, identically sized pre-printed blocks are not stacked exactly on top of each other but instead overlapping blocks are used.

In example 340 in FIG. 3, a 3D object 341 (which corresponds to an input job) is segmented into a core formed from a pre-printed block 1 of model material around which a custom shell is printed. During printing the printer forms the custom shell with an aperture which is sized to accommodate pre-printed block 1 and then the printer pauses at a point indicated by arrow 342 to enable an operator to insert pre-printed block 1 before the printing is continued to complete the object 341 (a prompt may be provided to the operator at this point). This example also shows the support material (shown as shaded region 343) which is used to support the object 341 during printing and in particular to support the overhang region 344. This overhang region 344 requires a significant amount of support material to be printed and to reduce the amount of support material that is required a pre-printed block 2 may be used. In this example, a shell of support material is printed with an aperture sized to take block 2 and then the printing is paused at a point indicated by arrow 345 to enable an operator to insert pre-printed block 2 into the aperture in the support material.

In the example shown in FIG. 3 and described above, the pre-printed blocks are not glued into the apertures. In some examples, the apertures may be sized to provide a push-fit for the block or the operator may apply some adhesive to hold the block in place. Where the block is being entirely overprinted (e.g. as shown in example 340 for both blocks) the overprinted layers will prevent the pre-printed block from falling out of the aperture. It will be appreciated that it may not be necessary to fix a pre-printed block of support material in place as this block is only required during printing and does not form part of the finished 3D object.

In example 340, both the blocks are inserted into apertures which have the same wall height as the height of the block being inserted. In other examples, however, the aperture may only have short walls (or a rim) to provide a locating mechanism for the inserted block (which reduces material cost) and this may, in particular, be used for pre-printed blocks of support material where the block does not form part of the finished 3D object.

Although example 340 shows a single pre-printed block of model material, block 1, in other examples, a 3D object may be formed using multiple pre-printed blocks and these blocks may be of the same size or different sizes.

In the above description, blocks 1 and 2 are described as being pre-printed and formed from either model material (block 1) or support material (block 2). However, in other examples, the blocks may be described as pre-formed and may be made of any suitable material. For example, block 2 may be made from glass rather than support material which reduces the amount of support material used and means that the block is re-usable (i.e. it is not dissolved/destroyed with the other support material 343 and can be used in the printing of other objects).

Use of pre-printed or pre-formed blocks as described above when printing 3D objects reduces the overall printing time and hence may increase throughput and reduce latency. Additionally their use may reduce the printing cost (e.g. where support blocks can be re-used or where model blocks can be formed more cheaply than 3D printing the equivalent structure) and/or change the mechanical properties of the object (e.g. block 1 may have a honeycomb internal structure which reduces its mass compared to a solid printed block of the same dimensions without reducing the strength of the resultant structure).

Where pre-printed blocks are used, these blocks may be printed by the printers in the 3D printing system when they are otherwise not being used or in parallel with other jobs (e.g. by combining the printing of the blocks with other input jobs using the combination methods described below).

Where the 3D object is segmented into multiple sub-objects, the sub-objects will need to subsequently be joined together (e.g. with glue) to form the complete 3D object required by the input job. This assembly may be performed manually by the user. In some examples, as shown in the example flow diagram in FIG. 4, connectors or connecting structures may be added automatically (i.e. without user intervention) to the 3D object (block 404) following segmentation (block 402) and two examples are shown in FIG. 3. In example 320, pegs 322 are added to the two smaller sub-objects 302-303 which correspond to recesses 324 which are added to the design of the larger sub-object 301. Once the three sub-objects 301-303 have been formed using 3D printing, a user can then snap them together using the automatically added connectors (pegs and recesses in this example) to form the entire 3D object. As an alternative to the connectors being added automatically (without any user input or intervention), the user may be prompted to tailor, amend or verify semi-automatic or automatically generated choices before the data is output to the printer.

It will be appreciated that the connectors shown in example 320 have a relatively simple form and in other examples more complex connecting structures may be used. For example, mechanical and latching connectors may be used which enable the parts to be joined together and not subsequently (easily) separated. In another example, screws may be printed on one sub-object and corresponding threaded holes formed in another sub-object to enable the two parts to be screwed together following printing.

Figure 4:
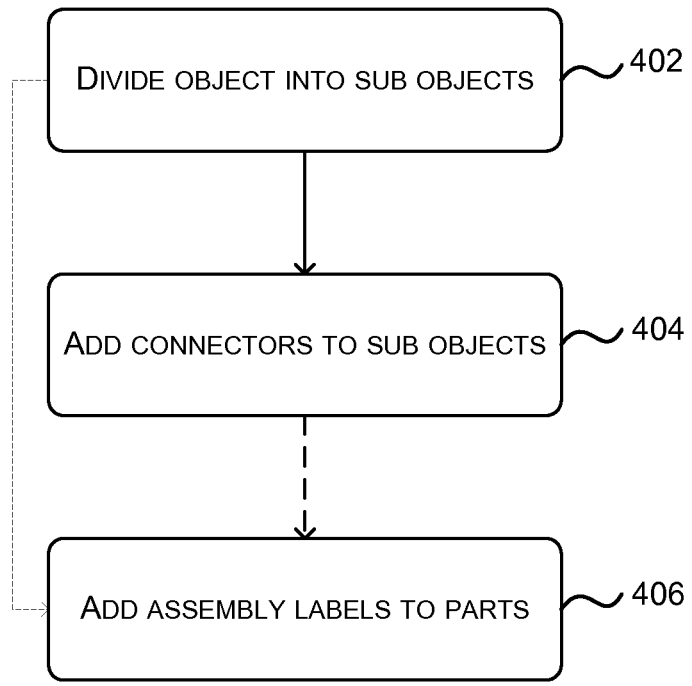
FIG. 4 is a flow diagram of an example method of automatically scheduling 3D printing to optimize latency and/or throughput.

For complex objects, the operation of assembling the entire object from the printed sub-objects may not be trivial (particularly as the user may not have any awareness of how the original object was segmented, e.g. where it was performed automatically without any user input or visibility). To assist with the assembly operation, as well as adding connectors or connecting structures (in block 404), assembly labels may be added to the parts (block 406). These assembly labels may be added in a way that they are not visible once the entire object has been assembled (e.g. corresponding letters or numbers on the ends of the pegs 322 and inside the recesses 324) and do not impede the assembly process. As an alternative to use of assembly labels, different connectors may be used for each join so that the sub-objects can only be assembled in one way, i.e. to form the entire 3D object which was requested by the user in the input job (e.g. by using different shaped pegs and recesses for each connection). It will be appreciated that assembly labels may be added even where connecting structures are not added (i.e. block 404 in FIG. 4 is omitted) to assist the user in assembling the 3D object (e.g. when gluing parts together).

Although examples 310 and 320 in FIG. 3 show the three individual sub-objects 301-303 being printed on the same 3D printer, it will be appreciated that where the 3D printing system (e.g. system 100 in FIG. 1) comprises more than one 3D printer, the individual sub-objects may be printed on different 3D printers if this optimizes latency and/or throughput.

In the final example 330 in FIG. 3, the connecting structure which is added (in block 404) is a piece of model material 332 which acts as a hinge between the large sub-object 301 and one of the smaller sub-objects 302-303. In this example, the automatic scheduling (in block 206 of FIG. 2) has still resulted in a single object being formed by the 3D printer, but the object has been folded down to optimize the 3D printing process and can be folded back out by the user following printing. The hinge structures which are used need not be true hinges, in that they need not be capable of being flexed many times, but instead may only be robust enough to bend once from the folded position to the unfolded position or may only be sufficiently robust to survive a few operations. Where a hinge structure is used, it may be coupled with a latching mechanism to prevent the subsequent folding of the 3D object.

In addition to, or instead of, printing labels to aid in assembly, labels may also be automatically included within the print jobs for other purposes. For example, labels may be added in the support material or on a separate additional object to label the printed structure. Such labels may enable the printed structure to be removed (or ejected) from the 3D printer and then subsequently put back into the same 3D printer or a different 3D printer. The labels may provide markers (e.g. fiducial markers) to align the re-inserted tray and/or to identify the tray. In an example scenario, a structure may be removed from a first 3D printer having a first resolution and inserted into a second 3D printer having a finer resolution, in order that finer resolution structures can be printed within a single print job/object.

Figure 5:
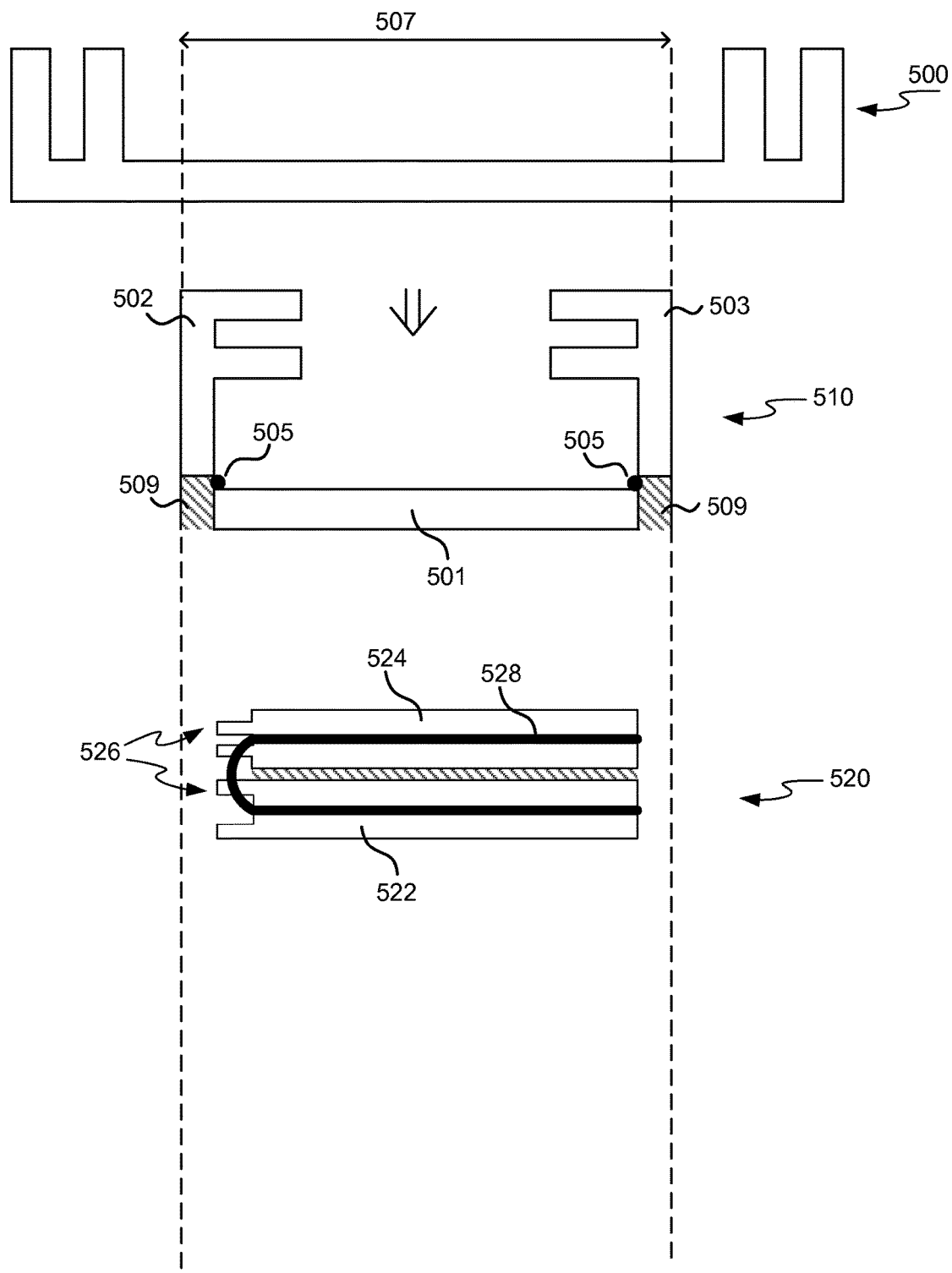
FIG. 5 shows a number of schematic diagrams of a 3D object segmented into sub-objects and rearranged for printing.

In examples where the segmentation (in block 206, 261 or 402) is performed because the 3D object is too large to fit within the printing envelope of a single 3D printer, the resultant sub-objects may be printed on different 3D printers and then joined together (e.g. using automatically added connectors). Alternatively, the resultant sub-objects may be printed on the same single 3D printer (e.g. sequentially) and then joined together (e.g. using automatically added connectors) and/or unfolded (e.g. where connecting structures acting as hinges have been automatically added). FIG. 5 shows an example of a large structure 500 which is segmented into three sub-objects 501-503 connected by connecting structures 505 in order that it can fit within the printing envelope 507. The structure 500 is printed in a folded position, with support material 509 used to support the folded ends. Although not shown in FIG. 5, a latching mechanism may be added to the sub-objects to prevent the structure from folding up again once it has been unfolded to form the intended 3D object (i.e. the 3D object described in the original input job).

In a second example 520 in FIG. 5, a long spar is shown being formed in two parts 522, 524. Connecting parts have been added to the ends 526 where the spar has been split and a connecting element 528 is provided between the two parts.

This connecting element 528 may be formed of the same material as the spar and post-tensioned following fabrication to hold the two parts 522, 524 together. Alternatively, if the connecting element 528 is formed pre-tensioned, following fabrication, the two parts 522, 524 can be joined together by stretching the connecting element 528 and joining the connecting parts together. Once connected, the tension in the connecting element 528 (however this tension is achieved) prevents, or at least inhibits, the two parts from separating again.

It will be appreciated that although it may be quicker to fabricate the sub-objects 501-503 in parallel on different 3D printers, there may not be more than one 3D printer available or there may be other reasons why a single printer may be used, e.g. user preference (as indicated in the user-defined metric), robustness of the resultant 3D object (e.g. dependent upon the strength of the hinge features), repeatability (e.g. printing both parts on the same printer may minimize the probability that parts will not fit together due to tolerances being different on different printers), color matching of materials, keeping other printer(s) free so that new jobs can be started with low latency, etc.

In addition to folding objects in order to improve latency and/or throughput, there may be other reasons why part of a 3D object is printed in a position which is offset from its final position within the object. In an example, a part of a 3D object which in its final position is required to apply pressure to another part of the structure may be printed in an offset position and then snapped into place (e.g. being held in the new position using a mechanical and latching connection) as a post-printing operation.

FIGS. 3-5 show segmentation of a single job into multiple sub-objects or sub jobs which may then be printed separately (e.g. on different printers or sequentially on the same printer) or at the same time on the same printer (e.g. sub-objects 302-303 in examples 310, 320 in FIG. 3). In addition to, or instead of, printing more than one sub-object from the same input job at the same time on the same printer, the optimization process (in block 206) may identify multiple jobs, or sub-objects from multiple jobs, that can be combined (or aggregated) and printed at the same time on the same printer, as shown in the schematic diagram in FIG. 6.

Figure 6:
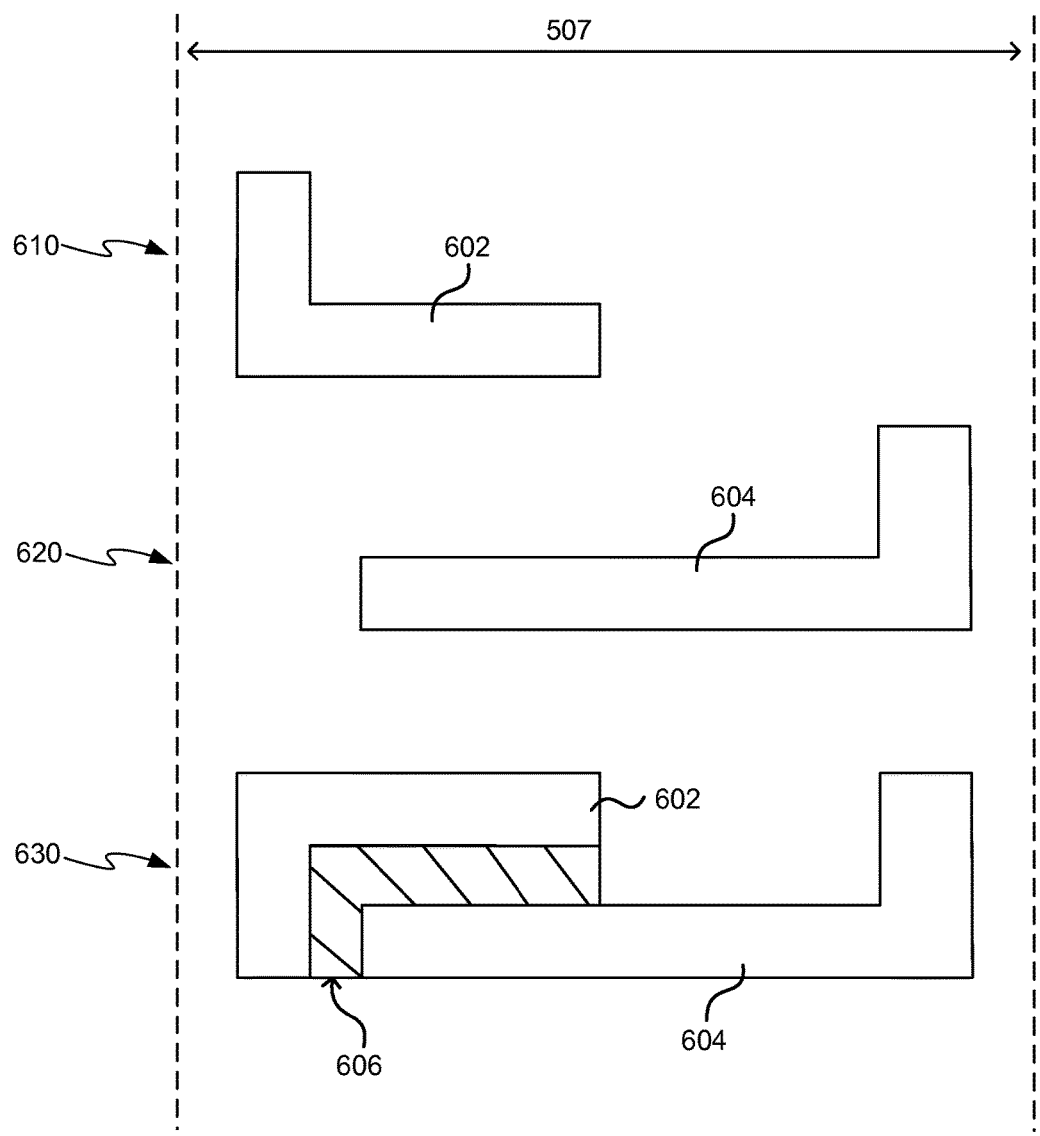
FIG. 6 shows a number 3D objects being combined and rearranged for printing.

FIG. 6 shows two 3D objects 602, 604 in cross-section which each correspond to a different input job. Each of these objects fits within the printing envelope 507 of a single 3D printer and the optimization process may arrange the objects to be printed at the same time (as shown in example 630) separated by support material, instead of scheduling one job (example 610) followed by the other job (example 620). Again, it will be appreciated that for clarity, cross-sections through the 3D objects are shown in the diagrams.

There are many different ways by which the combination of jobs may be performed. In an example, two objects which are too large to be placed side-by-side on the same tray can be printed vertically offset from one another (with support material intervening), or partially vertically offset (i.e. overlapping in the Z dimension). In this example, one useful approach is to automatically orient the objects so that the total support material used may be minimized, which may result in different print orientations to if the objects were printed individually. Another approach may be to choose and orient the uppermost object in a way that allows the support material to be removed from its surfaces quickly and manually, rather than requiring additional laborious and time-consuming steps such as water jetting or soaking in caustic soda.

Although the description above refers to automatic segmentation and combining of jobs without user input (other than via the user-defined metric), in some examples there may be some user involvement in the segmentation/combining process. For example, a user may be presented with a proposed segmentation strategy (e.g. in the form of an annotated drawing) and asked to confirm the placement of segmentation planes (e.g. as marked X-Y in FIG. 3). In another example, a user may identify a plurality of candidate (or permitted) segmentation planes and then the optimization process may use a constraint solver to select those planes (from the candidate planes) to use and to determine how to combine and/or reorient the sub-objects for printing.

In the above description, the optimization may be performed (in block 206) based on the current input jobs that have not been printed and then the resultant data output to the 3D printer (in block 208) for all those jobs, before the optimization is performed again. An example of such operation is shown in the first timeline 702 in FIG. 7 and this can be described with reference to the example flow diagram in FIG. 8. In this example, three input jobs A, B, C are received (in block 802) before the optimization is performed 722 (block 804). This optimization automatically schedules the three 3D printing jobs A, B, C, together, performing any dividing or combining of jobs (e.g. as in block 261 of FIG. 2) and/or reorienting of objects (e.g. as in block 262). Data is then output to the 3D printer(s) and whilst jobs A, B, C are being printed, two new jobs D, E are received (in multiple instances of block 808). In this example, the printing of these new jobs D, E does not start until jobs A, B, C have been completed (i.e. following the wait in block 810), although the optimization of jobs D, E 724 (block 806) may be performed shortly before the completion of the first three jobs.

In some examples, however, waiting until the first batch of jobs (jobs A, B, C) has been completed may not be optimum. This may, for example, be because the user requires one of the second batch of jobs to be performed urgently and/or because one of the second batch of jobs (D,E) could be printed in parallel with one of the first batch of jobs (A,B,C).

Figure 7:
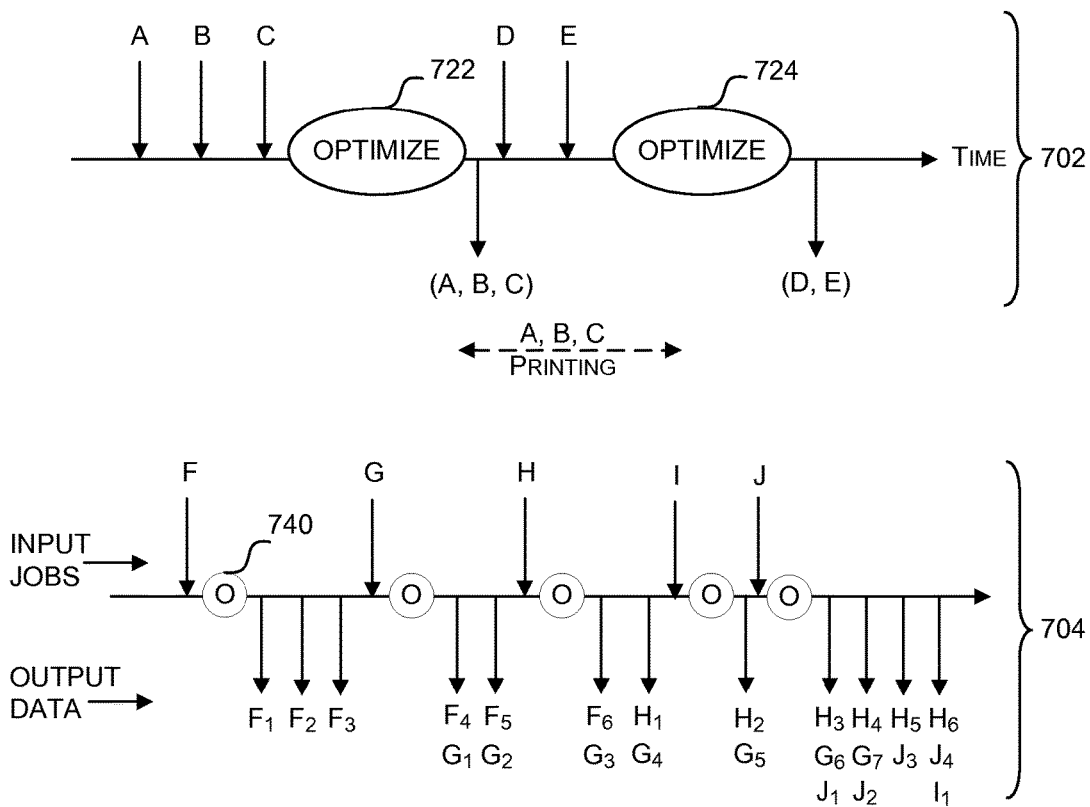
FIG. 7 shows two example timelines involving repeated scheduling to optimize latency and/or throughput of a 3D printing system.
Figure 8:
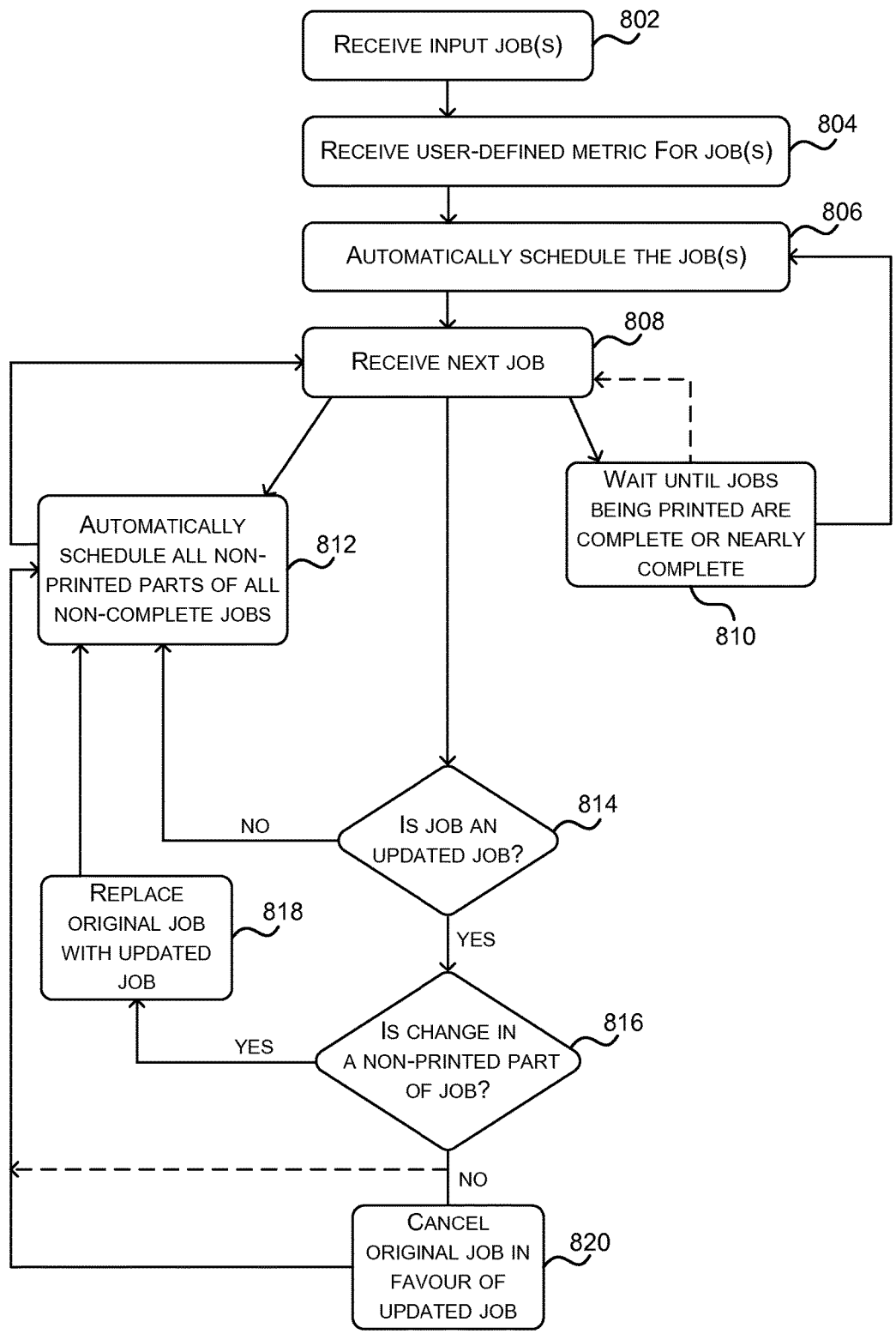
FIG. 8 is a flow diagram of another improved method of controlling a 3D printer or plurality of 3D printers.

In the second example timeline 704 in FIG. 7, the optimization 740 (block 806 or 812) is performed each time a new input job (and associated user-defined metric) is received (where an input job is drawn as an arrow pointing towards the timeline). Each time the optimization is performed it considers those jobs which have been partially completed (i.e. the structure which a 3D printer is in the process of forming) and any jobs which have not yet been started. This enables more urgent non-started jobs to be advanced in the queue of jobs ahead of less urgent non-started jobs and also enables jobs for small objects to be added in on-the-fly in parallel to other jobs.

In the example timeline 704, data which is output to the 3D printer(s) is indicated as an arrow pointing away from the timeline and each arrow is labeled with the layers of each job that are output to the 3D printers at each point in time. Initially there is only job F (received in block 802) and so the optimization is performed (in block 806) for job F alone and the first three layers are printed ($F_1$-$F_3$). When a second job, job G, arrives (block 808), the optimization is performed (block 812) and as a result both jobs are printed in parallel until a third job, job H is received (block 808). The optimization (block 812) determines that job H cannot be started immediately and instead printing of job H has to wait until job F has completed, but not until job G has completed. Similarly, when job I is received (in block 808) it is determined (in block 812) that the printing of job I cannot start straight away. Before the printing of job I can start (as scheduled in the optimization step following the receipt of job I), a further job, job J is received (in block 808) and the optimization (in block 812) determines that this job can (or should) be printed ahead of job I. Job J is then fitted into the printing schedule on the fly and the printing of job I is delayed. Although this example shows outputting single layers (for each job) at a time (where $F_1$ denotes layer 1 of job F), it will be appreciated that multiple layers may be output at any one time to the 3D printer(s), e.g. 4 layers at a time.

Where jobs are added on-the-fly, it may be necessary to form flat surfaces in the support material before a new job can be started. These support structures are added automatically as part of the optimization process. For example, many printers may allow printing of overhanging structures as long as the angle of overhand is no higher than a critical angle (e.g. 45 degrees). Thus, even an ongoing print of a vertical-sided object can have new objects added, by forming a new build raft at an angle under that critical angle to the side. In doing this, the weight of the new object and strength of the support material is considered, so that the new object is not so heavy that it snaps its support material. In another example process, a printer can automatically print small spare supporting pillars spread (e.g. uniformly) around the build tray surface, even if there is nothing due to be printed above those pillars at the start of the build process, just in case a new object is added to the print queue which could then use those supporting pillars (and additional overhanging support at under the critical angle) to create a large enough build area in "mid air" to build that object in parallel with the existing object.

Where the printing of one job will complete ahead of other jobs, the jobs may be oriented and the support structure designed to enable completed jobs to be removed from the 3D printer before the printing is completed (e.g. with such jobs being printed on the edge of the composite printed structure). In such an example, a user may be able to pause the 3D printer and remove (e.g. by snapping a support structure element) the completed job before the 3D printer continues printing.

In a similar manner to adding jobs on-the-fly, the optimization process may be used to enable users to start to print an object before the entire design of the object is finalized and/or to update a job which has already been submitted. Referring again to FIG. 8, if a job is received (in block 808) which is an updated version of a previous job ('Yes' in block 814), which may be indicated by the user-defined metric or in another way (e.g. based on filename), it is determined whether the change to the 3D object between the original job and the updated job relates to a part of the 3D object which has already been printed ('No' in block 816) or if it relates to a non-printed part of the 3D object ('Yes' in block 816). In the event that the change relates to a part of the object which has not already been printed ('Yes' in block 816), the original job may be replaced with the updated job (block 818) with information about how much of the object has been printed being retained and then the printing of the object (and any other pending jobs) may continue as described above, except that the updated job is used instead of the original job.

If however, the updated job details a change in a part of the 3D object that has already been printed, the original job may be cancelled (block 820) such that the rest of the structure is not printed (e.g. to prevent wasting of printing consumables on an unwanted object) and then the method may continue with the updated job being treated as if it was a new job, which may involve first printing a new raft using the support material. Alternatively, the original job may be completed (block 820 omitted) and the updated job considered in parallel as a new job.

Where the method allows a job to be updated after printing has started, information may be provided to the user (e.g. to the CAD software 114 used by the user to design or modify the 3D object) to provide them with a graphical indication of how much of the object has been printed. For example, the part of the object that has been printed may be shaded in the CAD software representation of the object or the user may be prevented from editing those parts of the object which have already been printed.

In addition, or instead, the user-defined metric may additionally indicate which parts of the 3D design have been finalized and which are still to be completed. In such an example, the 3D printing system may provide feedback to the user at a point when the 3D printer reaches a point where it would start to print a non-finalized part of the job. A user may be provided with a prompt and in response to a user input, the printing of the job may either continue or be paused (e.g. to enable the user to finalize more of the 3D design).

Figure 9:
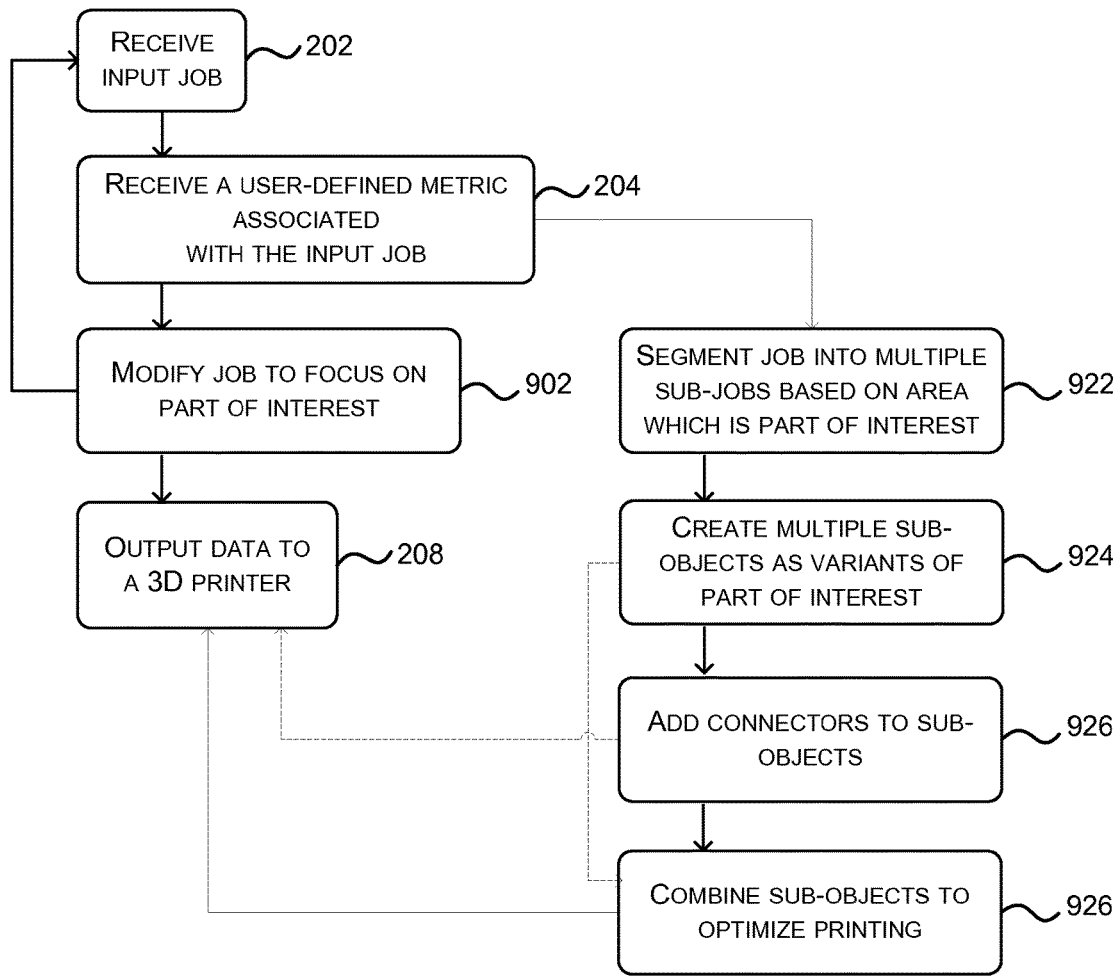
FIG. 9 is a flow diagram of a further improved method of controlling a 3D printer or plurality of 3D printers.

In some situations a user may wish to print a 3D object before the entire design has been finalized in order to assist them with making design choices for the complete design. In such an instance, the user-defined metric may specify a part of interest within the submitted job and the optimization process may involve modifying the input job to focus on the part of interest (block 902), as shown in FIG. 9, with the other parts of the object being simplified (e.g. such that they are printed in less detail or otherwise printed in a way which reduces the printing time and/or resources used on printing).

In addition to, or instead of, simplifying the parts of a 3D object which are not identified as being of interest by the user (in the user-defined metric), the optimization process may segment the object (block 920 in FIG. 9) and then create multiple variants of the part of interest with slight differences between each variant (block 922). For example, the dimensions of features within the area of interest may be changed slightly between variants (e.g. to change the radius of curvature or size of a feature). These multiple variants may be considered as additional sub-objects and may be combined as appropriate to optimize the printing process (block 926). As described above with reference to FIG. 4, connecting structures may be added to the sub-objects automatically (block 924) which in this example may enable the different variants of the part of interest to be interchanged by the user following printing.

Referring back to FIG. 1, this illustrates various components of an exemplary computing-based device 102 which may be implemented as any form of a computing and/or electronic device, and in which embodiments of the methods of optimizing 3D printing, as described above, may be implemented.

Computing-based device 102 comprises one or more processors 118 which may be microprocessors, controllers or any other suitable type of processors for processing computer executable instructions to control the operation of the device in order to optimize the 3D printing process (e.g. segmentation/aggregation/reorientation of 3D objects). In some examples, for example where a system on a chip architecture is used, the processors 118 may include one or more fixed function blocks (also referred to as accelerators) which implement a part of the method of optimization in hardware (rather than software or firmware). Platform software comprising an operating system 120 or any other suitable platform software may be provided at the computing-based device to enable application software 122 to be executed on the device. The application software 122 may include a 3D printing module 112 which performs the optimization and/or CAD software 114 which enables a user to create a 3D model of an object and submit this as a job for 3D printing.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The computer executable instructions may be provided using any computer-readable media that is accessible by computing based device 102. Computer-readable media may include, for example, computer storage media such as memory 124 and communications media. Computer storage media, such as memory 124, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 124) is shown within the computing-based device 102 it will be appreciated that the storage may be distributed or located remotely and accessed via a network or other communication link (e.g. using communication interface 116).

The memory 124 may also provide a data store 127. This data store may, for example, be used to store input jobs and user-defined metrics associated with each input job.

The computing-based device 102 also comprises a printer interface 126 arranged to output data to one or more 3D printers and may also comprise an input/output controller 128 arranged to output display information to a display device 106 which may be separate from or integral to the computing-based device 102. The display information may provide a graphical user interface. The input/output controller 128 is also arranged to receive and process input from one or more devices, such as a user input device 108 (e.g. a mouse, keyboard, camera, microphone or other sensor). In some examples the user input device 108 may detect voice input, user gestures or other user actions and may provide a natural user interface (NUI). This user input may be used to control the CAD software 114 and/or the 3D printing module 112. In an embodiment the display device 106 may also act as the user input device 108 if it is a touch sensitive display device. The input/output controller 128 may also output data to devices other than the display device.

Any of the input/output controller 128, display device 106 and user input device 108 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Although the present examples are described and illustrated herein as being implemented in a system 100 as shown in FIG. 1, the system described is provided as an example and not a limitation. As those skilled in the art will appreciate, the present examples are suitable for application in a variety of different types of computing systems and in some examples, the computing system may be distributed across multiple geographical locations and/or the 3D printing module may be provided as a service and may interface to many different 3D printers directly or indirectly (e.g. via another computing device).

The system 100 may comprise a plurality of 3D printers 104 which use the same 3D printing technology (e.g. FFF) or alternatively, the system 100 may comprise 3D printers which use different 3D printing technologies or variants of the same technology (e.g. 3D printers which use the same technology but provide different resolutions). Where the system comprises printers which use different 3D printing technologies, when an input job is segmented into multiple sub-objects, the segmentation may be based on the different capabilities of the different technologies (and hence of the different printers) and different sub-objects may be allocated (and hence data sent) to different printers to optimize the overall printing across the different technologies. For example, since printers often operate in different resolution modes or have different fundamental resolution capabilities, one sub-object with fine features may be printed on a finer-resolution printer, and the other may be printed on a coarser-resolution printer. Since fine-resolution printing is often slower, this may speed up the overall print throughput.

In another example, 3D printers often take significant time to change colors/materials in their cartridges, and waste significant material in the process. This may be because of the need to "purge" the old material so there is no trace left to discolor the new material. So, if multiple printers are available and compatible with a job's needs, and one of them is in an allowable color/material, then that printer could be selected to eliminate cartridge-swapping overhead. In another example, when a cartridge has little material left, only some smaller objects may be printed because the printer may not support changing cartridges halfway through a print (or even if it does, this is an overhead to be removed whenever possible). So, the printer with the least available material that is enough to finish the print may be chosen.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of controlling a 3D printing system comprising one or more 3D printers, the method comprising:
   receiving a plurality of input jobs, each input job comprising data describing a 3D object, and a user-defined metric associated with each input job;
   modifying the plurality of input jobs by scheduling the plurality of input jobs together to optimize at least one of latency or throughput of the system based on a printing envelope of each of the 3D printers, characteristics of each of the 3D printers and the user-defined metric associated with each input job, the scheduling being further based on at least the user's schedule or availability of a material associated with the plurality of input jobs, the scheduling comprising dividing an input job into a plurality of sub-jobs, each sub job comprising data describing a part of the 3D object corresponding to the input job; and
   causing at least one of the 3D printers to print the 3D object contained in the input job based on the modified plurality of input jobs.

2. The method according to claim 1, wherein scheduling the plurality of input jobs further comprises scheduling the plurality of sub jobs to optimize at least one of latency or throughput of the system.

3. The method according to claim 1, further comprising adding connecting structures to each of the parts of the 3D object to enable assembly of the parts to form the entire 3D object.

4. The method according to claim 3, wherein the connecting structures comprise hinge elements joining two of the parts together.

5. The method according to claim 3, wherein the connecting structures comprise connectors.

6. The method according to claim 1, further comprising adding assembly labels to each of the parts of the 3D object.

7. The method of claim 1, wherein the user-defined metric defines an area of interest within the 3D object of the input job and the method further comprises:
   creating multiple sub-jobs, each sub job comprising data describing a variant of the area of interest within the 3D object.

8. The method of claim 1, wherein the user-defined metric defines an area of interest within the 3D object of the input job and scheduling the one or more input jobs comprises:

modifying parts of the 3D object outside the area of interest to optimize at least one of latency or throughput of the system.

9. The method according to claim 1, wherein scheduling the one or more input jobs comprises combining at least part of two or more input jobs into a single print job to be printed on a single printer at substantially the same time.

10. The method according to claim 1, wherein scheduling the one or more input jobs comprises reorienting at least a part of an input job for printing.

11. The method according to claim 1, further comprising repeating the scheduling on receipt of a next input job and during printing of a previously received input job to further optimize at least one of latency or throughput of the system based on the printing envelope of each of the 3D printers, the characteristics of each of the 3D printers and the user-defined metric associated with each input job.

12. The method of claim 11, further comprising:
determining that the next input job is an updated version of the previously received input job, both the previously received input job and the updated version comprising data describing a 3D object; and
in response to determining that the next input job is an updated version of the previously received input job, determining that the updated version differs from the previously received input job only in relation to non-printed parts of the 3D object, and replacing the previously received input job with the updated version.

13. The method according to claim 11 further comprising:
determining that the next input job is a new input job and will be printed with the previously received input job, the previously received job having already begun printing, both the previously received input job and the new input job comprising data describing a 3D object; and
instructing the at least one of the 3D printers to print support structures sufficient to support the new input job in addition to the previously received job while the previously received job is being printed.

14. The method according to claim 1, wherein at least one input job comprises a pre-tensioned or post-tensioned connector.

15. The method according to claim 1 further comprising providing a graphical user interface arranged to receive a selection of:
a plurality of segmentation planes associated with an input job, the segmentation planes being optimized after selection; or
a segmentation strategy associated with the plurality of input jobs.

16. One or more computer storage media with device-executable instructions that, when executed by a computing system, direct the computing system to perform operations comprising:
receiving a first input job for 3D printing, the input job comprising data describing a 3D object, and a user-defined metric associated with the input job;
scheduling the first input job to optimize at least one of latency or throughput of the system based on a printing envelope of a 3D printer, characteristics of the 3D printer and the user-defined metric associated with the input job;
repeating the scheduling on receipt of a second input job and during printing of the first input job to further optimize at least one of latency or throughput of the system based on a printing envelope of the 3D printer, characteristics of the 3D printer and the user-defined metric associated with the input job;
determining that the second input job is an updated version of the first input job, both the first input job and the second input job comprising data describing the 3D object;
in response to determining that the second input job is an updated version of the first input job,
determining that the second input job differs from the first input job only in relation to non-printed parts of the 3D object;
replacing the first input job with the second input job; and
causing the 3D printer to print the 3D object contained in the second input job.

17. A 3D printing system comprising a computing device connected to a 3D printer, the computing device comprising:
one or more processors;
an interface coupled to the one or more processors and arranged to output data to the 3D printer; and
one or more memories coupled to the one or more processors, the one or more memories including instructions which upon execution cause the computing device to:
receive a plurality of input jobs, each input job comprising data describing a 3D object, and a user-defined metric associated with each input job;
modify the plurality of input jobs by scheduling the plurality of input jobs together to optimize at least one of latency or throughput of the system based on a printing envelope of the 3D printer, characteristics of the 3D printer and the user-defined metric associated with each input job, the scheduling being further based on at least the user's schedule or a material associated with the plurality of input jobs, the scheduling comprising dividing an input job into a plurality of sub-jobs, each sub-job comprising data describing a part of the 3D object corresponding to the input job; and
cause the 3D printer to print the 3D object contained in the input job based on the modified plurality of input jobs.

18. The system according to claim 17, wherein scheduling the plurality of input jobs further comprises scheduling the plurality of sub jobs to optimize at least one of latency or throughput of the system.

19. The system according to claim 17, wherein the data output to the 3D printer comprises instructions to print one or more blocks concurrently with the plurality of input jobs, the one or more blocks being independent of the plurality of input jobs.

20. The system according to claim 17, wherein the data output to the 3D printer comprises instructions to print one or more pre-tensioned connecting elements such that the one or more pre-tensioned connecting elements may be stretched to connect a plurality of other elements.

* * * * *